United States Patent [19]

Padtberg et al.

[11] Patent Number: 4,734,134

[45] Date of Patent: Mar. 29, 1988

[54] CEMENT SLURRIES, UNAFFECTED BY SALTS OF MAGNESIUM, FOR CEMENTING WELLS TRAVERSING SALT FORMATIONS, AND RELATED CEMENTING PROCESSES

[75] Inventors: Rüdiger O. Padtberg; Alfred Garnier, both of St. Etienne, France

[73] Assignee: Dowell Schlumberger Incorporated, Tulsa, Okla.

[21] Appl. No.: 870,599

[22] Filed: Jun. 4, 1986

[30] Foreign Application Priority Data

Jun. 14, 1985 [FR] France ................. 85 09095

[51] Int. Cl.$^4$ .............................. C04B 22/16
[52] U.S. Cl. ...................... 106/90; 106/314; 166/293
[58] Field of Search ............. 106/90, 314; 166/293

[56] References Cited

U.S. PATENT DOCUMENTS

| 3,654,151 | 4/1972 | King et al. | 106/90 |
| 3,657,134 | 4/1972 | King et al. | 106/90 |
| 3,794,506 | 2/1974 | Schmidt et al. | 106/90 |
| 4,225,361 | 9/1980 | Joseph | 106/314 |

FOREIGN PATENT DOCUMENTS

| 445941 | 7/1942 | Belgium . |
| 0146171 | 6/1985 | European Pat. Off. . |
| 640019 | 12/1978 | U.S.S.R. . |

OTHER PUBLICATIONS

Chemical Abstracts, 98:58912p, (1983); K. H. Arens et al.

*Primary Examiner*—Steven Capella
*Attorney, Agent, or Firm*—S. A. Littlefield

[57] ABSTRACT

The slurries according to the invention contain: >18% NaCl; Na silicate and an agent of compatibility with magnesium consisting of $H_3PO_4$ and HEDP diphosphonate.

Thickening time is not affected by the presence or absence of salts of magnesium, up to 30% of bischofite equivalents. The rheology of the slurry and the compressive strength of the cement are also practically unaffected by magnesium contamination or the lack thereof.

8 Claims, No Drawings

CEMENT SLURRIES, UNAFFECTED BY SALTS OF MAGNESIUM, FOR CEMENTING WELLS TRAVERSING SALT FORMATIONS, AND RELATED CEMENTING PROCESSES

This invention concerns the cementing of drilling wells and in particular of oil wells.

In drilling a well through underground formations in order to produce or inject fluids therein, the well must be cemented both to preserve its integrity and to keep control of the fluids injected therein or produced therefrom, among other purposes.

It is common practice for the production of fluids, such as for production of crude oil, to lower steel tubing into the drill hole. After this, a cement slurry with suitable properties is prepared at the surface and injected into the tubing. Thereafter, the cement slurry is displaced, meaning that a displacement fluid is injected behind it up to a level of a few meters above the shoe of the tubing. Nearly all the cement slurry is thus pushed back into the annular space or annulus between the tubing and the wall of the well.

The slurry having been placed, it is allowed to set and its mechanical strength is allowed to develop to obtain sound support for the tubing, suitable bonding with the surrounding rocks of various compositions and isolation of the respective zones from fluid migrations.

A great number of slurry formulations are known which enable the properties of the cement slurry (mainly its density, setting time or thickening time, rheology, fluid loss, free water, compressive strength, permeability and resistance to chemical attack) to be adapted to specific well requirements.

A good mix design is especially important when the cement slurry is used to cement a well drilled through salt formations, as the equilibrium conditions between the cement and the saline zones are difficult to establish. Failing to establish these equilibrium conditions soon results in the salts dissolving and the alkalies, alkaline earths and chlorides migrating into the cement, which slows the setting of the cement and consequently adversely affects its mechanical strength, and produces a poor bond between the cement and the surrounding formations.

Cement slurry mix designs designed to solve the problems associated with the traversing of salt formations have been proposed in French patent application No. 83 20303, filed on Dec. 19, 1983. These mixes are moderately to heavily salt-laden by sodium chloride and contain admixtures such as sodium silicate adapted to effect a novel fibrous bonding between the cement and the traversed formations. Provided other admixtures, such as citric acid, are further introduced, these mixtures can be used even in the context of magnesium contamination amounting to 3%.

The present invention is directed to providing improved cement slurry mixes for cementing wells, and in particular oil wells, exhibiting the following general properties:

(1) the slurry remains liquid (and thus pumpable) whether or not it has been contaminated by soluble magnesium mineral products, such as carnallite, bischofite and/or tachyhydrite, even in very large quantities;

(2) the setting time of the slurry is substantially constant, irrespective of magnesium contamination or non-contamination, even in very large quantities;

(3) and the cement's properties are not significantly deteriorated even if the slurry has been highly contaminated by a soluble salt of magnesium.

With the cement slurries known hereto, the traversing (or merely the risk of traversing) a layer containing soluble salts of magnesium raises the following well-known, yet serious problems:

(a) If a cement slurry which is not adapted to a magnesic contamination is subjected to such a contamination, its viscosity increases as the result of the precipitation of magnesium hydroxide to such an extent that it can no longer be pumped.

If the contamination is light, the slurry may remain pumpable, but its setting will nevertheless be accelerated by the magnesium so that the cementing operation being carried out will be adversely affected.

(b) If admixtures, such as retarders and the like are added to the cement slurry in anticipation of magnesium contamination and its accelerating effect, and such contamination does not in fact occur, or occurs to a lesser extent than anticipated, said admixtures will obviously have a very detrimental effect, such as excessively retarding setting or preventing setting altogether and thus severely disturbing cementing.

(c) In any case, a magnesium contamination adversely affects the cement's mechanical properties and in particular greatly reduces compressive strength.

These problems are avoided by the invention, which provides a slurry that is practically unaffected by the presence or absence of magnesium contamination.

The cement slurry compositions according to the invention contain a cement, mixing water and:

phosphoric acid ($H_3PO_4$), in a proportion of more than 0.5% and preferably less than 1.5% by weight of cement (BWOC), hydroxyethylenediphosphonate (HEDP), in a proportion of more than 0.25% BWOC (HEDP also acting as a retarder), NaCl, from 18% to saturation, sodium silicate, from 35 liters per metric ton of slurry up to approximately 150 l/t, various common admixtures (antifoam agents, etc.).

Such compositions are compatible, ie. exhibit the three abovementioned properties (1 through 3), with magnesium chloride ($MgCl_2$) present in a proportion of 0 to 40% of bischofite equivalents ($MgCl_2$, $6H_2O$) by weight of fresh water Said slurry compositions are thus unaffected by the presence or absence of magnesium contamination.

The invention thus resides in the presence of an "agent of compatibility with magnesium" consisting of $H_3PO_4$+HEDP in the proportions as indicated.

Nevertheless, if the quantity of sodium silicate is reduced or if the latter is eliminated entirely, very serious disturbances occur. In particular, the delay in setting considerably increases, the cement's compressive strength drops and the slurry's flow characteristics deteriorate. The greatest disadvantage by far in this case is the added delay in setting time.

The single appended table summarizes a number of non-limiting examples of mixes according to the invention and of comparative examples of mixes without the improvement of the invention.

Comparative examples 1*, 2*, 3* and 4* show that, without the combination of $H_3PO_4$ and HEDP according to the invention, the slurries are not compatible with magnesium.

Comparative examples 5* and 6* show that said combination of $H_3PO_4$+HEDP does not produce the desired effect below a certain threshold level of $H_3PO_4$ and HEDP content. Example 5 illustrates the critical nature of the lower thresholds according to the invention. It represents a boundary case.

Examples 7 through 14, of mixes according to the invention, show that when the slurry contains the $H_3PO_4$+HEDP combination in suitable proportions:

(a) thickening times are practically independent of the presence or absence of magnesium chloride and (b) the cement's compressive strength is not seriously affected by a bischofite equivalent contamination of up to 30% by weight of water.

In fact, the compressive strength in Example 8 (Mg contamination) is even greater than that of the cement in Example 7 (no Mg contamination), which is surprising.

These examples also show that the proportion of HEDP used in the compatibility agent is related to temperature: at low bottomhole circulation temperatures (BHCT=150° F.) an appropriate value is 0.5 (Examples 9 and 10); going up to 1 at 185° F. (Examples 11 and 12); then 1.5 at 250° F. (Examples 13 and 14). Obviously, these values are given only as an indication.

Finally, and particularly at high temperatures, the mixes according to the invention can be provided with an additional retarder such as borax.

TABLE

| Ex. No | NaCl % BWOW | HEDP % BWOC | $H_3PO_4$ % BWOC | $MgCL_2 \cdot 6H_2O$ % BWOW | TT (min) | kg/cm² (1) | YV dyne cm² | PV cP | Remarks |
|---|---|---|---|---|---|---|---|---|---|
| 1(*) | 30 | 1 | 0 | 0 | — | — | 201 | 36.2 | |
| 2(*) | 30 | 1 | 0 | 30 + | — | — | — | — | Rheo. |
| 3(*) | 30 | 0 | 1 | 0 | — | — | 610 | 79.3 | |
| 4(*) | 30 | 0 | 1 | 30 + | — | — | — | — | Slur |
| 5(*) | 30 | 0.25 | 0.5 | 30 + | — | — | | | Rheo. |
| 6(*) | 30 | 0.5 | 0.25 | 30 + | — | — | | | |
| 7 | 30 | 1 | 1 | 0 | 335 | 280 | 31.9 | | |
| 8 | 30 | 1 | 1 | 30 + | 327 | 293 | 45.6 | | |
| 9 | 30 | 0.5 | 1 | 0 | 243 | 308 | | T1 | |
| 10 | 30 | 0.5 | 1 | 30 ++ | 275 | 260 | | | |
| 11 | 30 | 1 | 1 | 0 | 371 | | | T2 | |
| 12 | 30 | 1 | 1 | 30 +++ | 340 | | | | |
| 13 | 30 | 1.5 | 1 | 0 | 214 | | | T3 | |
| 14 | 30 | 1.5 | 1 | 30 +++ | 198 | | | | |

Key to Table
TT = thickening time
CS = compressive strength (14-day strength, 221° F. - 105° C., 2000 psi - 140 kg/cm²)
Rheo = rheology impossible
Slur = slurry not pourable
T1 = test at 6000 psi (422kg/cm²); 150° F. (65° C.); 0.8°/min.
T2 = test at 6000 psi (422kg/cm²); 185° F. (85° C.); 0.8°/min.  } TT measurement
T3 = test at 10,200 psi (717kg/cm²); 250° F. (121° C.); 1.6°/min.
BWOW = by weight of water
BWOC = by weight of cement
YV = yield value
PV = plastic viscosity All tests based on API standard 10, 1984.
Slurry composition:
Dycherhoff cement, Class G, "Gulf" (tropical grade)
Na silicate: 0.19 l/l of fresh water
Fresh water: 44% minus the volume of liquid admixtures
NaCl, $H_3PO_4$, HEDP (retarders) and contamination by magnesium: see Table.
YV and PV: measured at 185° F. (85° C.)
Thickening time measured at 185° F. (85° C.) and 6000 psi (422 kg/cm²)

heating speed 0.8°/min. except where otherwise indicated.
(+)=added after mixing
(*)=comparative example (example 5 is a boundary example)
(1)=measured after 14 days at 220° F. (105° C.)
(++)=added after 40 min. with consistometer at 150° F. (65° C.)
(+++)=added after 40 min. with consistometer at 185° F. (85° C.).

What is claimed is:

1. Cement slurries unaffected by the presence or absence of soluble salts of magnesium, for cementing wells traversing or susceptible of traversing salt formations, containing mixing water, a cement, at least 18% NaCl by weight of water and an admixture compatible with magnesium consisting of more than 0.5% $H_3PO_4$ by weight of dry cement and more than 0.25% of hydroxyethylenediphosphonate (HEDP) by weight of dry cement.

2. Cement slurries as in claim 1, wherein the proportion of $H_3PO_4$ by weight of cement is 0.5 to 1.5%.

3. Cement slurries as in claim 1, further comprising sodium silicate solution in a proportion of between 35 and approximately 150 liters per metric ton of slurry.

4. Method of cementing an oil well, a gas well or similar well, whereby a slurry according to claim 1 is injected into the well.

5. A cement slurry as defined in claim 1, additionally comprising an anti-foaming agent.

6. Cement slurries as in claim 2, further comprising sodium silicate solution in a proportion of between 35 and approximately 150 liters per metric ton of slurry.

7. Method of cementing an oil well, a gas well or similar well, whereby a slurry according to claim 3 above is injected into the well.

8. Method of cementing an oil well, a gas well or similar well, whereby a slurry according to claim 5 above is injected into the well.

* * * * *